United States Patent
Lin (10) Patent No.: US 12,056,336 B2
(45) Date of Patent: Aug. 6, 2024

(54) DOCUMENT CONTENT POINT-AND-SELECT METHOD, ELECTRONIC APPARATUS AND MEDIUM

(71) Applicant: Beijing Paoding Technology Co., Ltd, Beijing (CN)

(72) Inventor: Demiao Lin, Beijing (CN)

(73) Assignee: Beijing Paoding Technology Co., Ltd, Beijing (CN)

( * ) Notice: Subject to any disclaimer, the term of this patent is extended or adjusted under 35 U.S.C. 154(b) by 0 days.

(21) Appl. No.: 18/100,743

(22) Filed: Jan. 24, 2023

(65) Prior Publication Data

US 2024/0019992 A1   Jan. 18, 2024

(30) Foreign Application Priority Data

Jul. 13, 2022 (CN) .......................... 202210820737.2

(51) Int. Cl.
*G06F 3/048* (2013.01)
*G06F 3/04842* (2022.01)
*G06F 3/0482* (2013.01)

(52) U.S. Cl.
CPC ................................ *G06F 3/04842* (2013.01)

(58) Field of Classification Search
CPC .................................................. G06F 3/04842
See application file for complete search history.

(56) References Cited

U.S. PATENT DOCUMENTS

| | | | | |
|---|---|---|---|---|
| 10,204,143 | B1* | 2/2019 | Dub | G06F 16/35 |
| 10,698,937 | B2* | 6/2020 | Curzi | G06F 9/5038 |
| 10,846,466 | B2* | 11/2020 | Vinay | G06F 40/166 |
| 11,416,673 | B1* | 8/2022 | Peterson | G06F 3/0483 |
| 11,443,102 | B1* | 9/2022 | Wilson | G06F 3/0482 |
| 11,599,250 | B1* | 3/2023 | Peterson | G06F 3/04842 |
| 11,727,083 | B2* | 8/2023 | Fisher | G06F 8/41 |
| | | | | 709/223 |
| 11,842,380 | B2* | 12/2023 | Isaacson | G06Q 30/0633 |
| 2011/0066957 | A1* | 3/2011 | Prats | H04L 67/146 |
| | | | | 709/204 |
| 2015/0120719 | A1* | 4/2015 | Aarabi | G06F 16/5838 |
| | | | | 707/728 |

(Continued)

*Primary Examiner* — David Phantana-angkool (57) ABSTRACT

Embodiments of the present disclosure disclose a document content point-and-select method, device, electronic apparatus, medium and program product. One implementation of the method includes: in response to detecting a point-and-click operation acting on an untagged document, determining document location information of the point-and-click operation; determining a document structure recognition result of the document content at a document location characterized by the document location information in the untagged document; in response to determining that the point-and-click operation is a first point-and-click operation, selecting a word text corresponding to the document location information from the document structure recognition result as a target word, and highlighting in an area corresponding to the target word; in response to determining that the point-and-click operation is a second point-and-click operation, selecting a sentence text corresponding to the document location information from the document structure recognition result as a target sentence.

7 Claims, 3 Drawing Sheets

(56) References Cited

U.S. PATENT DOCUMENTS

| | | | |
|---|---|---|---|
| 2016/0034431 A1* | 2/2016 | Hinrichs | G06F 40/106 |
| | | | 715/208 |
| 2019/0179958 A1* | 6/2019 | Curzi | G06F 16/31 |
| 2020/0081964 A1* | 3/2020 | Maneriker | G06F 40/103 |
| 2022/0222426 A1* | 7/2022 | Zionpour | G06F 3/0481 |
| 2022/0358286 A1* | 11/2022 | Wilson-Thomas | G06F 40/274 |
| 2023/0055241 A1* | 2/2023 | Zionpour | G06F 40/166 |
| 2023/0133730 A1* | 5/2023 | Peterson | G06F 40/279 |
| | | | 715/764 |
| 2023/0409813 A1* | 12/2023 | Chen | G06F 3/0484 |
| 2024/0019992 A1* | 1/2024 | Lin | G06F 3/04842 |
| 2024/0021004 A1* | 1/2024 | Lin | G06V 30/413 |

* cited by examiner

DOCUMENT CONTENT POINT-AND-SELECT METHOD, ELECTRONIC APPARATUS AND MEDIUM

CROSS-REFERENCE TO RELATED APPLICATIONS

The present application is based on, and claims priority from, Chinese application number 202210820737.2, filed Jul. 13, 2022, the disclosure of which is hereby incorporated by reference herein in its entirety.

TECHNICAL FIELD

Embodiments of the present disclosure relate to the field of computer technology, and in particular, to a document content point-and-select method, electronic apparatus and medium.

BACKGROUND

Untagged documents, such as PDF files, can be easier to read and display the page with the same effect on different devices. At present, the interface interaction for untagged documents is usually to: click and pull back to select.

However, the inventor found that when using the above method to perform interface interaction in an untagged document, there are often the following technical problems:

First, the user needs to accurately pull and select the document content which needs to be selected. When the pulled and selected document content is incorrect, the user needs to do it again, which makes the user's operation rather cumbersome, and when pulls to the end of the document content to be selected, in order to accurately select the document content, the user needs to slow down the pull speed, which results in a fairly long time for pulling and selecting the document content.

Second, it is impossible to automatically select an entire sentence, which makes it impossible to quickly perform operations related to the entire sentence, and thus cannot quickly translate the entire sentence.

Third, copy and paste can only be performed based on the characters in the table displayed in the untagged document, and the complete table cannot be automatically copied.

The above information disclosed in this background section is only for enhancement of understanding of the background of the inventive concept and therefore it may contain information that does not form the prior art that is already known in this country to a person having ordinary skill in the art.

SUMMARY

The content of the present disclosure is to introduce ideas in a brief form, and these ideas will be described in detail in the following section of the detailed description of the invention. The content of the present disclosure is not intended to identify the key features or essential features of the claimed technical solution, nor is it intended to limit the scope of the claimed technical solution.

Some embodiments of the present disclosure propose a document content point-and-select method, electronic apparatus and computer-readable medium to solve one or more of the technical problems mentioned in the above background section.

In the first aspect, some embodiments of the present disclosure provide a document content point-and-select method for an untagged document, the method comprising: in response to detecting a point-and-click operation acting on the untagged document, determining the document location information of the point-and-click operation; determining a document structure recognition result of the document content at the document location characterized by the document location information in the untagged document; in response to determining that the point-and-click operation is a first point-and-click operation, selecting the word text corresponding to the document location information from the document structure recognition result as a target word, and highlighting the area corresponding to the target word in the untagged document; in response to determining that the point-and-click operation is a second point-and-click operation, selecting the sentence text corresponding to the document location information from the document structure recognition result as a target sentence, and highlighting the area corresponding to the target sentence in the untagged document.

In the second aspect, some embodiments of the present disclosure provide a document content point-and-select device for an untagged document, the device comprising: a first determination unit, configured to determine, in response to detecting a point-and-click operation acting on the untagged document, the document location information of the point-and-click operation; a second determination unit, configured to determine a document structure recognition result of the document content at the document location characterized by the document location information in the untagged document; a first display unit, configured to select the word text corresponding to the document location information from the document structure recognition result as a target word, and highlight the area corresponding to the target word in the untagged document, in response to determining that the point-and-click operation is a first point-and-click operation; a second display unit, configured to select the sentence text corresponding to the document location information from the document structure recognition result as a target sentence, and highlight the area corresponding to the target sentence in the untagged document, in response to determining that the point-and-click operation is a second point-and-click operation.

In the third aspect, some embodiments of the present disclosure provide an electronic apparatus, comprising: one or more processors; a storage device on which one or more programs are stored, and when the one or more programs are executed by the one or more processors, the one or more processors are made to implement the method described in any of the implementations in the first aspect above.

In the fourth aspect, some embodiments of the present disclosure provide a computer-readable medium on which a computer program is stored, wherein the program when executed by a processor implements the method described in any of the implementations in the first aspect above.

In the fifth aspect, some embodiments of the present disclosure provide a computer program product, comprising a computer program which, when executed by a processor, implements the method described in any of the implementations in the first aspect above.

The above embodiments of the present disclosure have the following beneficial effects: through the document content point-and-click method of some embodiments of the present disclosure, the user operation of selecting the document content in an untagged document is simplified, and the time for the user to select the document content in an untagged document is shortened. To be specific, the reason why the user's operation of selecting the document content in an untagged document is cumbersome and the time for the user to select the document content in an untagged document is rather long is that: the user needs to accurately pull and select the document content which needs to be selected, and if the pulled and selected document content is incorrect, the user needs to do it again, which makes the user's operation rather cumbersome, and when pulls to the end of the document content to be selected, in order to accurately select the document content, the user needs to slow down the pull speed, which results in a fairly long time for pulling and selecting the document content. On this basis, the document content point-and-select method according to some embodiments of the present disclosure, in response to detecting a point-and-click operation acting on the untagged document, first determines the document location information of the point-and-click operation. Thus, the document location information can characterize the location where the user clicked in the untagged document. Then, a document structure recognition result of the document content at the document location characterized by the document location information in the untagged document is determined. Thus, through the location clicked by the user in the untagged document, the document structure recognition result of the document content corresponding to the location can be determined. Thereafter, in response to determining that the point-and-click operation is a first point-and-click operation, select the word text corresponding to the document location information from the document structure recognition result as a target word, and highlight the area corresponding to the target word in the untagged document. Therefore, when the point-and-click operation is a first point-and-click operation, select and highlight the word text corresponding to the clicked location from the document structure recognition result, thus showing the effect of having selected a word. Finally, in response to determining that the point-and-click operation is a second point-and-click operation, select the sentence text corresponding to the document location information from the document structure recognition result as a target sentence, and highlight the area corresponding to the target sentence in the untagged document. Therefore, when the point-and-click operation is a second point-and-click operation, select and highlight the sentence text corresponding to the clicked location from the document structure recognition result, thus showing the effect of having selected a sentence. Also because the user does not use the pull-and-select method when making selections, the content in the untagged document can be selected directly through a point-and-click operation, thus simplifying the user's operation of selecting the document content in an untagged document and shortening the time for the user to select the document content in an untagged document.

BRIEF DESCRIPTION OF THE DRAWINGS

The above and other features, advantages, and aspects of the embodiments of the present disclosure will become more apparent in conjunction with the accompanying drawings and with reference to the following embodiments. Throughout the drawings, the same or similar reference signs indicate the same or similar elements. It should be understood that the drawings are schematic, and the components and elements are not necessarily drawn to scale.

DETAILED DESCRIPTION OF THE INVENTION

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be noted that, for ease of description, only the portions related to the relevant invention are shown in the drawings. In the case of no conflict, the embodiments in the present disclosure and the features in the embodiments can be combined with each other.

It should be noted that concepts such as "first" and "second" mentioned in the present disclosure are only used to distinguish different devices, modules or units, and are not used to limit the order of functions performed by these devices, modules or units or interdependence.

It should be noted that such adjuncts as "one" and "more" mentioned in the present disclosure are illustrative, not restrictive, and those skilled in the art should understand that, unless the context clearly indicates otherwise, they should be understood as "one or more".

The names of messages or information exchanged between multiple devices in the implementations of the present disclosure are only for illustrative purposes, and are not intended to limit the scope of these messages or information.

The present disclosure will be described in detail below with reference to the accompanying drawings and in conjunction with embodiments.

Figure 1:
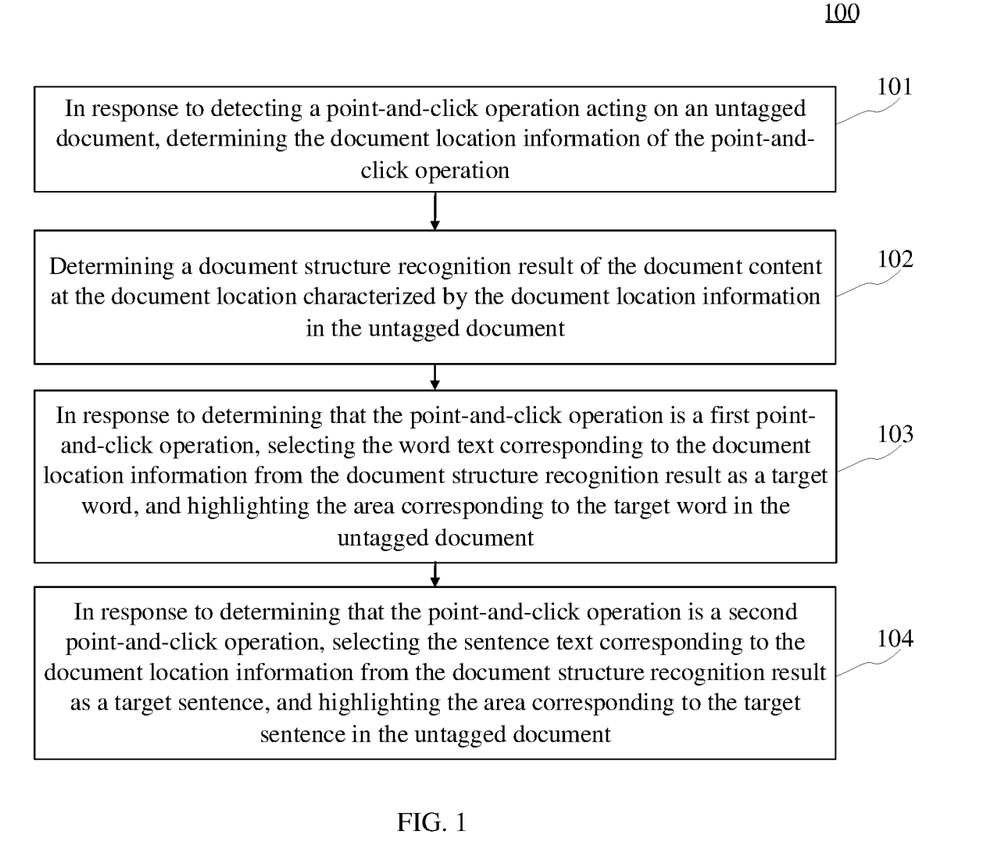
FIG. 1 is a flowchart of some embodiments of a document content point-and-select method according to the present disclosure.

FIG. 1 shows a flow 100 of some embodiments of a document content point-and-select method according to the present disclosure. The document content point-and-select method comprises the following steps of:

Step 101, in response to detecting a point-and-click operation acting on an untagged document, determining the document location information of the point-and-click operation.

In some embodiments, the execution body (e.g., a computing device) of the document content point-and-select method may, in response to detecting a point-and-click operation acting on an untagged document, determine the document location information of the point-and-click operation. Wherein, the untagged document may be a document with no structured label to identify the document structure. For example, the untagged document may be, but not limited to, a PDF (Portable Document Format) document. The document location information may be information characterizing the location of the point-and-click operation in the untagged document. The document location information may include document coordinates. The document coordinates may characterize the location in the document, and may include abscissa and ordinate. For example, document coordinates can be PDF coordinates. In practice, the execution body may determine the document coordinates at the location corresponding to the point-and-click operation as the document location information.

It should be noted that the above computing device may be hardware or software. When the computing device is hardware, it can be implemented as a distributed cluster composed of multiple servers or terminal devices, or can be implemented as a single server or a single terminal device. When the computing device is embodied as software, it may be installed in the hardware devices listed above. It can be implemented, for example, as multiple software or software modules for providing distributed services, or as single software or software module. No specific limitation is made here.

It should be understood that the number of computing devices is merely illustrative. There may be any number of computing devices depending on implementation needs.

Step 102, determining a document structure recognition result of the document content at the document location characterized by the document location information in the untagged document.

In some embodiments, the execution object may determine a document structure recognition result of the document content at the document location characterized by the document location information in the untagged document. Wherein, the document structure recognition result may be a recognition result obtained after performing document structure recognition on the document content. The document structure recognition result may include text content. The document structure recognition result may also include, but is not limited to, text types. The text content may include the recognized text. The text types can be the types of document content. For example, the text types may include, but are not limited to: headings, paragraphs, charts, images, tables. In practice, the execution body may determine whether there are respective document structure recognition results corresponding to the current document page. Then, in response to determining that there are not respective document structure recognition results corresponding to the current document page, recognize the document structure of the current document page to obtain respective document structure recognition results. For example, document structure recognition can be performed by means of object detection. Secondly, in response to determining that there are respective document structure recognition results corresponding to the current document page, select, from the respective document structure recognition results, a document structure recognition result that the document region of the corresponding document content contains the document coordinates included in the document location information may. Finally, the selected document structure recognition result may be determined as the document structure recognition result of the document content at the document location characterized by the document location information.

Alternatively, before step 101, the execution body may perform a document structure recognition processing on the untagged document to obtain a document structure recognition result set.

In certain optional implementations of some embodiments, the execution body may determine, from the document structure recognition result set, a document structure recognition result of the document content at the document location characterized by the document location information in the untagged document. In this way, the document structure recognition can be performed on the entire untagged document in advance, such that a document structure recognition result at the current click location can be selected from the document structure recognition result set recognized in advance.

Step 103, in response to determining that the point-and-click operation is a first point-and-click operation, selecting the word text corresponding to the document location information from the document structure recognition result as a target word, and highlighting the area corresponding to the target word in the untagged document.

In some embodiments, the execution body may, in response to determining that the point-and-click operation is a first point-and-click operation, select the word text corresponding to the document location information from the document structure recognition result as a target word, and highlight the area corresponding to the target word in the untagged document. Wherein, the first point-and-click operation may be an operation for clicking on a word. For example, the first point-and-click operation may be a double-click operation. Here, the specific setting of the first point-and-click operation is not limited. The first point-and-click operation may be, but is not limited to, one of the following: a single-click operation, a double-click operation, a triple-click operation, and a shortcut-key click-combination operation. The shortcut-key click-combination operation may be N point-and-click operations performed after pressing at least one shortcut key. The area corresponding to the target word may be an area of the bounding box of the target word in the untagged document. The bounding box may be a smallest bounding box, or be a bounding box whose length is greater than or equal to the length of the smallest bounding box of the target word and/or whose width is greater than or equal to the width of the smallest bounding box of the target word. In practice, first, the execution body can select the word text corresponding to the document location information from the document structure recognition result as the target word by the following steps to:

In the first step, select from the document structure recognition result a character text whose corresponding character location information and the document location information satisfy a first preset distance condition, as a target character text. Wherein, the character location information may be information characterizing the location of a single character. For example, the character position information can characterize the central coordinate position of a single character. For another example, the character location information can also characterize the vertex coordinate positions of the smallest bounding box of a single character. The character location information may be expressed in document coordinates. The above character text may be characters in the text content included in the document structure recognition result. The first preset distance condition may be "the distance between the document coordinates of the character text and the document coordinates included in the document location information is the smallest".

In the second step, select from the document structure recognition result a first preset number of character texts arranged before the target character text, as an anterior character text, and obtain an anterior character text sequence. Wherein, the first preset number may be a number set in advance. Here, the specific setting of the first preset number is not limited. For example, the first preset number may be 10.

In the third step, select from the document structure recognition result a second preset number of character texts arranged behind the target character text, as a posterior character text, and obtain a posterior character text sequence. Wherein, the second preset number may be a number set in advance. Here, the specific setting of the second preset number is not limited. For example, the second preset number may be 10. It should be noted that the second preset number may be the same as the first preset number, or may be different from the first preset number.

In the fourth step, combine the anterior character text sequence and the posterior character text sequence successively to obtain a combined text. In practice, the above execution body may splice the posterior character text sequence after the anterior character text sequence to obtain a combined text.

In the fifth step, perform word segmentation processing on the combined text to obtain a word segmentation text set. In practice, the above execution body may use a word segmentation algorithm to perform word segmentation processing on the combined text to obtain the word segmentation text set. For example, the word segmentation algorithm may be a mechanical word segmentation algorithm, a word segmentation algorithm based on a hidden Markov model, or a word segmentation algorithm based on a conditional random field.

In the sixth step, select from the word segmentation text set a word segmentation text whose corresponding word location information and the document location information satisfy a second preset distance condition, as the word text corresponding to the document location information, so as to use the word text as a target word. Wherein, the word location information may be information characterizing the location of the word text. For example, the word location information can characterize the central coordinate position of the word text. For another example, the word location information can also characterize the vertex coordinate positions of the smallest bounding box of the word text. The word location information may be expressed in document coordinates. The second preset distance condition may be "the distance between the document coordinates of the word text and the document coordinates included in the document location information is the smallest".

Then, the smallest bounding box of the target word can be displayed in the untagged document, so that the target word is highlighted.

Step 104, in response to determining that the point-and-click operation is a second point-and-click operation, selecting the sentence text corresponding to the document location information, from the document structure recognition result, as a target sentence, and highlighting the area corresponding to the target sentence in the untagged document.

In some embodiments, the execution body may, in response to determining that the point-and-click operation is a second point-and-click operation, select the sentence text corresponding to the document location information, from the document structure recognition result, as a target sentence, and highlight the area corresponding to the target sentence, in the untagged document. Wherein, the second point-and-click operation may be an operation for clicking on a single sentence. For example, the second point-and-click operation may be a shortcut-key click-combination operation. For example, the shortcut-key click-combination operation may be one point-and-click operation performed after pressing the "Alt" key. Here, the specific setting of the second point-and-click operation is not limited. The second point-and-click operation may be, but not limited to, one of the following: a single-click operation, a double-click operation, a triple-click operation, and a shortcut-key click-combination operation. The area corresponding to the target sentence may be an area of the bounding box of the target sentence in the untagged document. The bounding box may be a smallest bounding box, or a bounding box whose length is greater than or equal to the length of the smallest bounding box of the target sentence and/or whose width is greater than or equal to the width of the smallest bounding box of the target sentence. In practice, firstly, the execution body can select the sentence text corresponding to the document location information, from the document structure recognition result, as the target sentence by the following steps to:

In the first step, select from the document structure recognition result a character text whose corresponding character location information and the document location information satisfies a first preset distance condition, as a target character text.

In the second step, determine the character text in the document structure recognition result, that satisfies a preset sentence start location condition corresponding to the target character text, as a sentence start character. Wherein, the preset sentence start location condition may be "the sentence-ending character before the character text is a sentence-ending character which is before the target character text and is closest to the target character text". A sentence-ending character can be a character that characterizes the end of a sentence. For example, it can be the character "○" or the character ".".

In the third step, determine the sentence-ending character that satisfies a preset sentence end location condition corresponding to the target character text in the document structure recognition result, as a sentence end character. Wherein, the preset sentence end location condition may be "the sentence-ending character is a sentence-ending character which is behind the target character text and is closest to the target character text".

In the fourth step, determine the text from the sentence start character to the sentence end character in the document structure recognition result, as a sentence text corresponding to the document location information, so as to use the sentence text as a target sentence.

Then, display the smallest bounding box of the target sentence in the untagged document, so as to highlight the target sentence.

Alternatively, the above execution body may highlight the area corresponding to the target sentence in the untagged document through the following steps to:

In the first step, superimpose the display of a highlight layer for the area corresponding to the target sentence in the untagged document according to a preset transparency, preset fill color and preset border information. Wherein, the preset transparency may be a transparency set in advance. For example, the preset transparency may be 20%. The preset fill color may be a preset color for filling the highlight layer. The preset fill colors can be represented by color numbers. The preset boarder information may be boarder-related information of the preset highlight layer. The preset border information may include border color, border style information, and border thickness. The border style information may be information related to the border style, and may include a style identification number characterizing the border style. The highlight layer may be a floating layer for superimposing the area corresponding to the target sentence for display. Here, the size of the highlight layer may be the same as the smallest bounding box of the target sentence, or may be larger than the smallest bounding box of the target sentence. Thus, the area corresponding to the target sentence can be displayed in a selected effect, according to the preset transparency, preset fill color and preset border information.

In the second step, display a sentence editing toolbar at the preset position of the highlight layer. Wherein, the preset position may be above or below the highlight layer. Here, the specific setting of the preset position is not limited. The above sentence editing toolbar may be a toolbar for editing the sentence text. In the sentence editing toolbar display a sentence translation control, at least one sentence annotation control, sentence erasing control, and sentence copy control. The sentence translation control may be a control for receiving a selection operation to translate the target sentence. Here, the translation method can be English-Chinese translation by default, or can be set by the user themselves. The sentence annotation control in the above at least one sentence annotation control may be a control for performing annotation processing on the target sentence. The at least one sentence annotation control may include, but is not limited to, at least one of the following: an underline annotation control, a delete annotation control, and a highlight annotation control. The sentence erasing control may be a control for erasing the target sentence. The sentence copy control may be a control for copying the target sentence.

In the third step, in response to detecting a selection operation acting on the sentence translation control, display a translated text corresponding to the target sentence and a translated text copy control corresponding to the translated text. In practice, the execution body may display the translated text corresponding to the target sentence above or below the highlight layer. The translated text copy control corresponding to the translated text may be displayed below the translated text.

In the fourth step, in response to detecting the selection operation acting on the translated text copy control, copy the translated text for pasting the translated text.

In the fifth step, in response to detecting the selection operation acting on the sentence erasing control, display the target sentence displayed in the untagged document to be the background color of the untagged document. Thus, displaying the background color of the untagged document can achieve the effect of erasing the target sentence.

In the sixth step, in response to detecting the selection operation acting on the sentence copy control, copy the target sentence for pasting the target sentence. Here, the selection operation may include, but is not limited to, at least one of the following: clicking, dragging, and hovering.

In the seventh step, in response to detecting the selection operation acting on any sentence annotation control in the at least one sentence annotation control, and according to the annotation mode corresponding to any sentence annotation control, annotate the target sentence displayed in the untagged document. For example, if the user can click on the underline annotation control, an underline will be displayed below the target sentence displayed in the untagged document.

Alternatively, the execution body can also, in response to detecting that the point-and-click operation is a sixth point-and-click operation, select the sentence text corresponding to the document location information, from the document structure recognition result, as a target sentence, and highlight the area corresponding to the target sentence in the untagged document, and display the translated text corresponding to the target sentence. Wherein, the sixth point-and-click operation may be an operation for directly translating a single sentence after clicking on the single sentence. For example, the sixth point-and-click operation may be a shortcut-key click-combination operation. For example, the sixth point-and-click operation may be one point-and-click operation performed after pressing the "Alt" and "Ctrl" keys. Here, the specific setting of the sixth point-and-click operation is not limited. The sixth point-and-click operation may be, but not limited to, one of the following: a single-click operation, a double-click operation, a triple-click operation, and a shortcut-key click-combination operation. In practice, the execution body may display a floating window at the surrounding position of the target sentence in the untagged document. Wherein, the translated text corresponding to the target sentence is displayed in the floating window. The surrounding position may be a position in any direction displayed corresponding to the target sentence. For example, the surrounding position may be above or below the target sentence. Thus, the user can be further enabled to quickly translate the entire sentence.

The above technical solution, as an inventive point of the embodiments of the present disclosure, solves the second technical problem mentioned in the background art: it is impossible to automatically select an entire sentence, which makes it impossible to quickly perform operations related to the entire sentence, and thus cannot quickly translate the entire sentence. The factor that makes it impossible to quickly translate the entire sentence is often as follows: it is impossible to automatically select an entire sentence, which makes it impossible to quickly perform operations related to the entire sentence. If the above factor is solved, the effect of fast translation of the entire sentence can be achieved. In order to achieve this effect, the present disclosure displays a sentence editing toolbar when highlighting the area of the target sentence. In the sentence editing toolbar display a sentence translation control, at least one sentence annotation control, sentence erasing control, and sentence copy control, so the user can quickly perform related operations on the entire sentence through various controls in the sentence editing toolbar. Also because the sentence translation control is displayed in the sentence editing toolbar, the entire sentence can be quickly translated.

Alternatively, the execution body may, in response to determining that the point-and-click operation is a third point-and-click operation, select a paragraph text corresponding to the document location information, from the document structure recognition result, as a target paragraph, and highlight the area corresponding to the target segment in the untagged document. Wherein, the third point-and-click operation may be an operation for clicking on a single paragraph. For example, the third point-and-click operation may be a triple-click operation. Here, the specific setting of the third point-and-click operation is not limited. The third point-and-click operation may be, but not limited to, one of the following: a single-click operation, a double-click operation, a triple-click operation, and a shortcut-key click-combination operation. The area corresponding to the target segment may be an area of the bounding box of the target segment in the untagged document. The bounding box may be a smallest bounding box, or a bounding box whose length is greater than or equal to the length of the smallest bounding box of the target paragraph and/or whose width is greater than or equal to the width of the smallest bounding box of the target paragraph. In practice, the execution body may, in response to determining that the text type included in the document identification result is a paragraph, determine the text content included in the document identification result to be the paragraph text corresponding to the document location information, as the target paragraph. Then, the smallest bounding box of the target paragraph can be displayed in the untagged document, so that the target paragraph can be highlighted. Thus, the user can quickly select the paragraph text in the untagged document.

Alternatively, firstly, the execution subject may, in response to determining that the point-and-click operation is a fourth point-and-click operation, determine whether there is a table corresponding to the document location information in the document structure recognition result. Wherein, the fourth point-and-click operation may be an operation for clicking on a table. For example, the fourth point-and-click operation may be a triple-click operation. Here, the specific setting of the fourth point-and-click operation is not limited. The fourth point-and-click operation may be, but not limited to, one of the following: a single-click operation, a double-click operation, a triple-click operation, and a shortcut-key click-combination operation. In practice, the execution body may determine that a table corresponding to the document location information exists in the document structure recognition result, in response to determining that the text type included in the document recognition result is a table. Then, in response to determining that there is a table corresponding to the document location information in the document structure recognition result, use the table as a target table, and highlight the area corresponding to the target table in the untagged document. Wherein, the area corresponding to the target table may be an area of the bounding box of the target table in the untagged document. The bounding box may be a smallest bounding box, or a bounding box whose length is greater than or equal to the length of the smallest bounding box of the target table and/or whose width is greater than or equal to the width of the smallest bounding box of the target table. In practice, the smallest bounding box of the target table may be displayed in the untagged document, so as to highlight the target table. Thus, the user can quickly select the entire table in the untagged document.

Alternatively, the execution body may highlight the area corresponding to the target table in the untagged document by the following steps to:

In the first step, display a bounding box outside the area corresponding to the above target table in the untagged document, for highlighting. The size of the bounding box may be larger than the size of the smallest bounding box of the target table. In practice, the execution body may display the bounding box outside the area corresponding to the target table in the untagged document, according to a preset color for displaying the bounding box.

In the second step, at a preset page position where the page of the untagged document is displayed, display a table corresponding to the document location information in the document structure recognition result and a table editing toolbar corresponding to the table. Wherein, the preset page position may be a position set in advance in the page. For example, the preset page position may be the sidebar position on the right side of the untagged document in the above page. The table corresponding to the document location information may be a structured table obtained through document structure recognition. The table displayed at the preset page position may have a border. The table editing toolbar may be a toolbar for editing the table displayed at the preset page position. A table copy control and at least one table adjustment control are displayed in the table editing toolbar. The table copy control may be a control for copying the table displayed at the preset page position. The table adjustment control in the above at least one table adjustment control may be a control for adjusting a table. The at least one table adjustment control may include, but is not limited to, at least one of the following: a table border adjustment control group, a border style adjustment control group, and an alignment mode adjustment control group.

In the third step, in response to detecting an adjustment operation acting on any table adjustment control in the at least one table adjustment control, update the display of the table displayed at the preset page position according to the adjustment operation. Wherein, the adjustment operation may be an operation of adjusting the table. For example, the adjustment operation may be a selection operation acting on the table border adjustment controls in the above table border adjustment control group. As an example, the user firstly selects all the tables displayed at the preset page positions, then selects the corresponding center-aligned alignment mode adjustment control in the alignment mode adjustment control group. Then, the alignment mode of the characters in the table displayed at the preset page position is updated to the center alignment. Thereby, the identified structured tables can be adjusted.

In the fourth step, in response to detecting a selection operation acting on the table copy control, copy the table displayed at the preset page position, for table pasting. In this way, the table displayed at the preset page position can be copied.

The above technical solution, as an inventive point of the embodiments of the present disclosure, solves the technical problem 3 mentioned in the background art: "copy and paste can only be performed based on the characters in the table displayed in the untagged document, and the complete table cannot be automatically copied". In order to achieve the effect of automatically copying the complete table, the present disclosure, when highlighting an area of the target table, displays, at a preset page position where the page of the untagged document is displayed, a table corresponding to the document location information in the document structure recognition result and a table editing toolbar corresponding to the table. A table copy control and at least one table adjustment control are displayed in the table editing tool bar, so that the user can adjust the table displayed at the preset page position through the table adjustment control. The table displayed in the preset page position can be copied through the table copy control. Also because the table displayed at the preset page position is a structured table obtained through document structure recognition and has a border, the complete table can be automatically copied through the table copy control.

Alternatively, first, the above execution body may, in response to determining that the point-and-click operation is a seventh point-and-click operation and that the document structure recognition result has a table corresponding to the document location information, select the text of a cell corresponding to the document location information from the above table as a cell text. The above seventh point-and-click operation may be an operation for clicking on the cell text in the table. For example, the seventh point-and-click operation may be a double-click operation in the table area. Here, the specific setting of the seventh point-and-click operation is not limited. The seventh point-and-click operation may be, but not limited to, one of the following: a single-click operation, a double-click operation, a triple-click operation, and a shortcut-key click-combination operation. Then, the area corresponding to the cell text in the untagged document may be highlighted. Wherein, the area of the cell text may be a bounding box of the cell text. The bounding box may be a smallest bounding box, or a bounding box whose length is greater than or equal to the length of the smallest bounding box of the cell text and/or whose width is greater than or equal to the width of the smallest bounding box of the cell text. The area of the cell text may also be a cell of the cell text. In practice, the execution body may highlight the area of the cell text. Thus, the user can quickly select the cell text in the table.

Alternatively, the above execution body may also display a cell editing toolbar at a position outside the preset cell in the area corresponding to the cell text. Wherein, the position outside the preset cell may be any position around the cell. For example, the position outside the preset cell may be below the cell. The cell editing toolbar may be a toolbar for editing the cell text and/or the cell of the cell text. In the cell editing toolbar, a cell text copy control, at least one cell text annotation control, and at least one cell annotation control may be displayed. The cell text copy control may be a control for receiving a user's selection operation to copy the cell text. The cell text style annotation control may be a control for annotating the text style of the cell text. For example, the at least one cell text style annotation control may include a cell text annotation control characterizing a deletion of the cell text. The cell annotation control may be a control for annotating the cell of the cell text. For example, the at least one cell annotation control may include a cell annotation control for highlighted annotation of the cells. The execution body may, in response to detecting a selection operation acting on the cell text copy control, copy the cell text, for pasting the cell text. Thus, the user can perform related operations on the selected cell text or cell, through the controls displayed in the cell editing toolbar.

Alternatively, firstly, the execution body may, in response to determining that the point-and-click operation is a fifth point-and-click operation, determine whether there is a graph corresponding to the document location information in the document structure recognition result. Wherein, the fifth point-and-click operation may be an operation for clicking on a chart or an image. For example, the fifth point-and-click operation may be a single-click operation. Here, the specific setting of the fifth point-and-click operation is not limited. The fifth point-and-click operation may be, but not limited to, one of the following: a single-click operation, a double-click operation, a triple-click operation, and a shortcut-key click-combination operation. In practice, the execution body may, in response to determining that the text type included in the document recognition result is a chart or an image, determine that there is a graph corresponding to the document location information in the document structure recognition result. Then, in response to determining that there is a graph corresponding to the document location information in the document structure recognition result, use the graph as a target graph, and highlight the area corresponding to the target graph in the untagged document. Wherein, the above graph may be a chart or an image. The area corresponding to the target graph may be an area of the bounding box of the target graph in the untagged document. The bounding box may be a smallest bounding box, or a bounding box whose length is greater than or equal to the length of the smallest bounding box of the target graph and/or whose width is greater than or equal to the width of the smallest bounding box of the target graph. In practice, the smallest bounding box of the target graph may be displayed in the untagged document, so that the target graph can be highlighted. Thereby, the user can be enabled to quickly select the entire chart or image in the untagged document.

It should be noted that the first point-and-click operation, the second point-and-click operation, the third point-and-click operation, the fourth point-and-click operation, the fifth point-and-click operation, the sixth point-and-click operation, and the seventh point-and-click operation in the embodiments of the present disclosure are different point-and-click operations that can be distinguished by the clicking method and the area corresponding to the clicked position.

The foregoing embodiments of the present disclosure have the following beneficial effects: through the document content point-and-click method of some embodiments of the present disclosure, the user operation of selecting the document content in an untagged document is simplified, and the time for the user to select the document content in the untagged document is shortened. To be specific, the reason why the user's operation of selecting the document content in the untagged document is cumbersome and the time for the user to select the document content in the untagged document is rather long, lies in that: the user needs to accurately pull and select the document content required to be selected, and if the selected document content is incorrect, the user needs to do it again, which makes the user's operation rather cumbersome, and when pulls to the end of the document content to be selected, in order to accurately select the document content, the user needs to slow down the pull speed, which results in a fairly long time for pulling and selecting the document content. On this basis, the document content point-and-select method according to some embodiments of the present disclosure, in response to detecting a point-and-click operation acting on the untagged document, firstly determines the document location information of the point-and-click operation. Thus, the document location information can characterize the location where the user clicked in the untagged document. Then, a document structure recognition result of the document content at the document location characterized by the document location information in the untagged document is determined. Thus, the document structure recognition result of the document content corresponding to the location can be determined through the location clicked by the user in the untagged document. Thereafter, in response to determining that the point-and-click operation is a first point-and-click operation, select the word text corresponding to the document location information from the document structure recognition result as a target word, and highlight the area corresponding to the target word in the untagged document. Therefore, when the point-and-click operation is a first point-and-click operation, the word text corresponding to the clicked location is selected and highlighted from the document structure recognition result, thus showing the effect of having selected a word. Finally, in response to determining that the point-and-click operation is a second point-and-click operation, the sentence text corresponding to the document location information is selected from the document structure recognition result as a target sentence, and the area corresponding to the target sentence in the untagged document is highlighted. Therefore, when the point-and-click operation is a second point-and-click operation, it is possible to select and highlight the sentence text corresponding to the clicked location from the document structure recognition result, thus showing the effect of having selected a single sentence. Also because the user does not use the pull-and-select method when making selections, the content in the untagged document can be selected directly through a point-and-click operation, thus simplifying the user's operation of selecting the document content in the untagged document and shortening the time for the user to select the document content in the untagged document.

Figure 2:
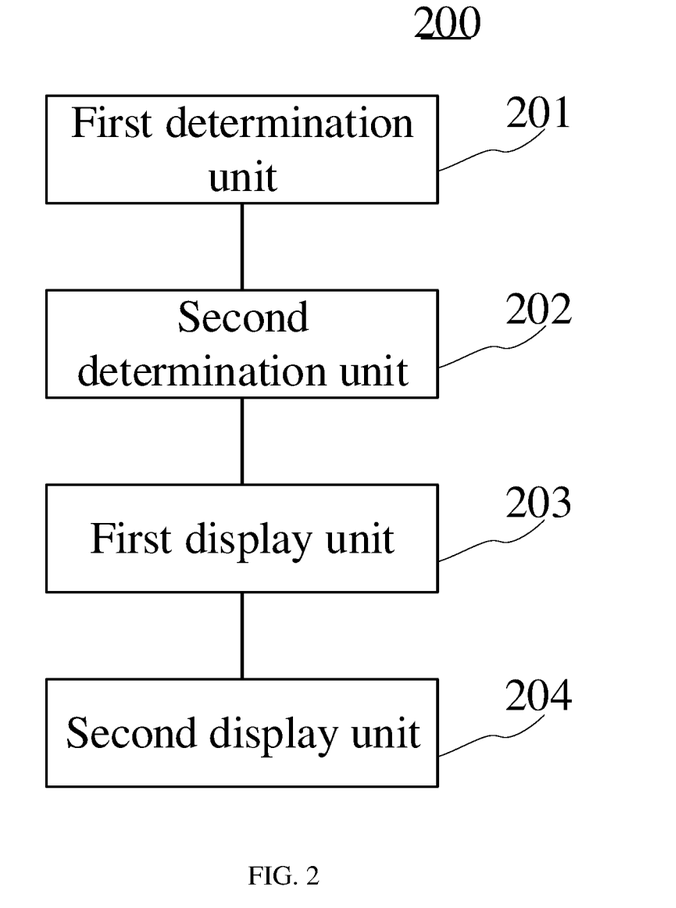
FIG. 2 is a schematic structural diagram of some embodiments of a document content point-and-select device according to the present disclosure.

With further reference to FIG. 2, as an implementation of the methods shown in the above drawings, the present disclosure provides some embodiments of a document content point-and-select device for an untagged document, and these embodiments of device correspond to the embodiments of method shown in FIG. 1, and the device can be specifically applied to various electronic apparatus.

As shown in FIG. 2, a document content point-and-select device 200 of some embodiments comprises: a first determination unit 201, a second determination unit 202, a first display unit 203 and a second display unit 204. Wherein, the first determination unit 201 is configured to determine, in response to detecting a point-and-click operation acting on the untagged document, the document location information of the point-and-click operation; the second determination unit 202 is configured to determine a document structure recognition result of the document content at the document location characterized by the document location information in the untagged document; the first display unit 203 is configured to, in response to determining that the point-and-click operation is a first point-and-click operation, select the word text corresponding to the document location information from the document structure recognition result as a target word, and highlight the area corresponding to the target word in the untagged document; the second display unit 204 is configured to, in response to determining that the point-and-click operation is a second point-and-click operation, select the sentence text corresponding to the document location information from the document structure recognition result as a target sentence, and highlight the area corresponding to the target sentence in the untagged document.

It can be understood that the units recorded in the device 200 correspond to the respective steps in the method described with reference to FIG. 1. Therefore, the operations, features, and beneficial effects described above with respect to the method are also applicable to the device 200 and the units comprised therein, and details are not described herein again.

Figure 3:
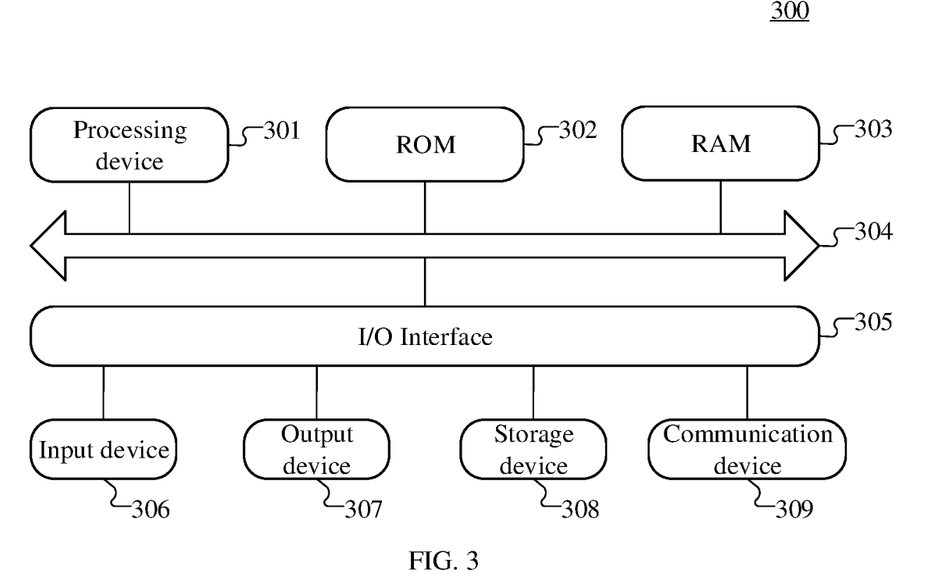
FIG. 3 is a schematic structural diagram of an electronic apparatus suitable for implementing some embodiments of the present disclosure.

Referring now to FIG. 3, a schematic structural diagram of an electronic apparatus (e.g., computing device) 300 suitable for implementing some embodiments of the present disclosure is shown. The electronic apparatus in some embodiments of the present disclosure may include, but are not limited to, mobile terminals such as mobile phones, notebook computers, digital broadcast receivers, PDAs (personal digital assistants), PADs (tablets), PMPs (portable multimedia players), in-vehicle terminals (such as in-vehicle navigation terminals) and the like, and stationary terminals such as digital TVs, desktop computers, and the like. The electronic apparatus shown in FIG. 3 is only one example, and should not impose any limitation on the function and scope of use of the embodiments of the present disclosure.

As shown in FIG. 3, the electronic apparatus 300 may include a processing device (e.g., central processing unit, graphics processor, etc.) 301, which can perform various appropriate actions and processes according to the program stored in the Read Only Memory (ROM) 302 or the program loaded from the storage device 308 into the Random Access Memory (RAM) 303. In the RAM 303, various programs and data necessary for the operation of the electronic apparatus 300 are also stored. The processing device 301, the ROM 302, and the RAM 303 are connected to each other through a bus 304. An input/output (I/O) interface 305 is also connected to bus 304.

In general, the following devices may be connected to the I/O interface 305: an input device 306 including, for example, touch screen, touchpad, keyboard, mouse, camera, microphone, accelerometer, gyroscope, etc.; an output device 307 including, for example, Liquid Crystal Display (LCD), speaker, vibrator, etc.; a storage device 308 including, for example, magnetic tape, hard disk, etc.; and a communication device 309. The communication device 309 may allow the electronic apparatus 300 to communicate wirelessly or by wire with other apparatus to exchange data. Although FIG. 3 shows an electronic apparatus 300 with various devices, it should be understood that not all of the illustrated devices are required to be implemented or provided. More or fewer devices may alternatively be implemented or provided. Each block shown in FIG. 3 may represent one device, or may represent multiple devices as required.

In particular, according to some embodiments of the present disclosure, the processes described above with reference to the flowchart may be implemented as computer software programs. For example, some embodiments of the present disclosure include a computer program product comprising a computer program carried on a computer-readable medium, the computer program containing a program code for performing the method illustrated in the flowchart. In some such embodiments, the computer program may be downloaded and installed from the network via the communication device 309, or installed from the storage device 308, or installed from the ROM 302. When the computer program is executed by the processing device 301, the above functions defined in the methods of some embodiments of the present disclosure are performed.

It should be noted that the computer-readable medium described in some embodiments of the present disclosure may be a computer-readable signal medium or a computer-readable storage medium, or any combination of the two. The computer-readable storage medium can be, for example, but is not limited to, an electrical, magnetic, optical, electromagnetic, infrared, or semiconductor system, apparatus, or device, or a combination of any of the above. More specific examples of computer-readable storage medium may include, but are not limited to, electrical connections with one or more wires, portable computer disks, hard disks, Random Access Memory (RAM), Read Only Memory (ROM), Erasable Programmable Read Only Memory (EPROM or flash memory), optical fiber, portable Compact Disk Read Only Memory (CD-ROM), optical storage device, magnetic storage device, or any suitable combination of the above. In some embodiments of the present disclosure, a computer-readable storage medium can be any tangible medium that contains or stores a program that can be used by or in conjunction with an instruction execution system, apparatus, or device. In some embodiments of the present disclosure, a computer-readable signal medium may include a data signal propagated in baseband or as part of a carrier wave, carrying a computer-readable program code therein. Such propagated data signals may take a variety of forms, including but not limited to electromagnetic signal, optical signal, or any suitable combination of the foregoing. A computer-readable signal medium can also be any computer-readable medium other than a computer-readable storage medium. The computer-readable signal medium can transmit, propagate, or transport the program for use by or in connection with the instruction execution system, apparatus, or device. The program code included on the computer-readable medium may be transmitted using any suitable medium including, but not limited to, electrical wire, optical fiber cable, RF (radio frequency), etc., or any suitable combination of the foregoing.

In some embodiments, the client and the server may use any currently known or future developed network protocol such as HTTP (HyperText Transfer Protocol) to communicate, and can interconnect with digital data communication (e.g., communication network) in any form or medium. Examples of communication networks include Local Area Network ("LAN"), Wide Area Network ("WAN"), internet (e.g., the Internet), and peer-to-peer networks (e.g., ad hoc peer-to-peer networks), as well as any currently known or future developed network.

The computer-readable medium may be included in the above electronic apparatus; or may exist alone without being assembled into the electronic apparatus. The computer-readable medium carries one or more programs, and when the one or more programs are executed by the electronic apparatus, the electronic apparatus is made to: in response to detecting a point-and-click operation acting on the untagged document, determine the document location information of the point-and-click operation; determine a document structure recognition result of the document content at the document location characterized by the document location information in the untagged document; in response to determining that the point-and-click operation is a first point-and-click operation, select the word text corresponding to the document location information from the document structure recognition result as a target word, and highlight the area corresponding to the target word in the untagged document; in response to determining that the point-and-click operation is a second point-and-click operation, select the sentence text corresponding to the document location information from the document structure recognition result as a target sentence, and highlight the area corresponding to the target sentence in the untagged document.

The computer program code for carrying out operations of some embodiments of the present disclosure may be written in one or more programming languages, including object-oriented programming languages such as Java, Smalltalk, C++, or a combination thereof, and further including conventional procedural programming languages such as the "C" language or similar programming languages. The program code may be executed entirely on the user's computer, partly on the user's computer, as a stand-alone software package, partly on the user's computer and partly on a remote computer, or entirely on the remote computer or server. In the case involving a remote computer, the remote computer may be connected to the user's computer through any kind of network, including a Local Area Network (LAN) or a Wide Area Network (WAN), or may be connected to an external computer (e.g., using an Internet service provider to connect via the Internet).

The flowchart and block diagram in the accompanying drawings illustrate the architecture, functionality, and operation that could possibly be implemented by the system, method and computer program product of the various embodiments of the present disclosure. In this regard, each block in the flowchart or block diagram may represent a module, a program segment, or a portion of code. The module, program segment, or portion of code contains one or more executable instructions for implementing the specified logical functions. It should also be noted that, in some alternative implementations, the functions noted in the blocks may occur in an order different from that noted in the accompanying drawings. For example, two blocks shown in succession may, in fact, be executed substantially concurrently, or they may sometimes be executed in the reverse order, depending upon the functionality involved. It should also be noted that each block of the block diagram and/or flowchart, and combinations of blocks in the block diagram and/or flowchart, can be implemented by a dedicated hardware-based system that performs the specified function or operation, or be implemented by a combination of dedicated hardware and computer instructions.

The units described in some embodiments of the present disclosure may be implemented by means of software, and may also be implemented by means of hardware. The described unit can also be provided in the processor, and for example, can be described as: a processor comprising a first determination unit, a second determination unit, a first display unit and a second display unit. Wherein, the names of these units do not constitute a limitation of the unit itself under certain circumstances, for example, the first determination unit may also be described as "a unit that, in response to detecting a point-and-click operation acting on the untagged document, determines the document location information of the point-and-click operation".

The functions described above may be performed, at least in part, by one or more hardware logic components. For example, without restriction, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logical Device (CPLD) and more.

Some embodiments of the present disclosure also provide a computer program product, comprising a computer program, which, when executed by a processor, implements any of the foregoing document content point-and-select methods.

The above description is merely some preferred embodiments of the present disclosure and illustrations of the applied technical principles. Those skilled in the art should understand that the scope of the invention involved in the embodiments of the present disclosure is not limited to the technical solutions formed by the specific combination of the above technical features, and should cover at the same time, without departing from the above inventive concept, other technical solutions formed by any combination of above technical features or their equivalent features, for example, a technical solution formed by replacing the above features with the technical features of similar functions disclosed (but not limited to) in the embodiments of the present disclosure.

What is claimed is:

1. A document content point-and-select method for an untagged document, comprising:
   in response to detecting a point-and-click operation acting on the untagged document, determining document location information of the point-and-click operation;
   determining a document structure recognition result of document content at a document location wherein characterized by the document location information in the untagged document;
   in response to determining that the point-and-click operation is a first point-and-click operation, selecting a word text corresponding to the document location information from the document structure recognition result as a target word, and highlighting an area corresponding to the target word in the untagged document;
   in response to determining that the point-and-click operation is a second point-and-click operation, selecting a sentence text corresponding to the document location information from the document structure recognition result as a target sentence, and highlighting an area corresponding to the target sentence in the untagged document, wherein, the selecting the sentence text corresponding to the document location information from the document structure recognition result as the target sentence, comprises:

selecting from the document structure recognition result, a character text whose corresponding character location information and the document location information satisfy a first preset distance condition, as a target character text;

determining a character text that satisfies a preset sentence start location condition corresponding to the target character text in the document structure recognition result, as a sentence start character, wherein, the preset sentence start location condition is that the sentence-ending character before the character text is a sentence-ending character which is before the target character text and is closest to the target character text;

determining a sentence-ending character that satisfies a preset sentence end location condition corresponding to the target character text in the document structure recognition result, as a sentence end character, wherein, the preset sentence end location condition is that the sentence-ending character is a sentence-ending character which is behind the target character text and is closest to the target character text;

determining a text from the sentence start character to the sentence end character in the document structure recognition result, as the sentence text corresponding to the document location information, so as to use the sentence text as the target sentence.

2. The method of claim 1, wherein, the method further comprises:

in response to determining that the point-and-click operation is a third point-and-click operation, selecting a paragraph text corresponding to the document location information from the document structure recognition result as a target paragraph, and highlighting an area corresponding to the target segment in the untagged document.

3. The method of claim 1, wherein, the method further comprises:

in response to determining that the point-and-click operation is a fourth point-and-click operation, determining whether there is a table corresponding to the document location information in the document structure recognition result;

in response to determining that there is the table corresponding to the document location information in the document structure recognition result, using the table as a target table, and highlighting an area corresponding to the target table in the untagged document.

4. The method of claim 1, wherein, the method further comprises:

in response to determining that the point-and-click operation is a fifth point-and-click operation, determining whether there is a graph corresponding to the document location information in the document structure recognition result;

in response to determining that there is the graph corresponding to the document location information in the document structure recognition result, using the graph as a target graph, and highlighting an area corresponding to the target graph in the untagged document.

5. The method of claim 1, wherein, in response to detecting a point-and-click operation acting on the untagged document, before determining the document location information of the point-and-click operation, the method further comprises:

performing a document structure recognition processing on the untagged document to obtain a document structure recognition result set; and the determining the document structure recognition result of the document content at the document location characterized by the document location information in the untagged document, comprises:

determining, from the document structure recognition result set, the document structure recognition result of the document content at the document location characterized by the document location information in the untagged document.

6. An electronic apparatus, comprising:

one or more processors;

a storage device, on which one or more programs are stored, when the one or more programs are executed by the one or more processors, the one or more processors are made to implement the method of claim 1.

7. A non-transitory computer-readable medium, on which a computer program is stored, wherein the program when executed by a processor implements the method of claim 1.

* * * * *